US005455713A

United States Patent [19]
Kreitzer

[11] Patent Number: 5,455,713
[45] Date of Patent: Oct. 3, 1995

[54] HIGH PERFORMANCE, THERMALLY-STABILIZED PROJECTION TELEVISION LENS SYSTEMS

[76] Inventor: Melvyn H. Kreitzer, 8816 Tulipwood Ct., Cincinnati, Ohio 45242

[21] Appl. No.: 81,629

[22] Filed: Jun. 23, 1993

[51] Int. Cl.⁶ .................................................. G02B 13/18
[52] U.S. Cl. .......................................................... 359/649
[58] Field of Search ................................... 359/649, 651, 359/650, 713, 708

[56] References Cited

U.S. PATENT DOCUMENTS

| 4,300,817 | 11/1981 | Betensky . |
| 4,348,081 | 9/1982 | Betensky . |
| 4,526,442 | 7/1985 | Betensky . |
| 4,682,862 | 7/1987 | Moskovich . |
| 4,697,892 | 10/1987 | Betensky . |
| 4,699,476 | 10/1987 | Clarke ..................................... 359/650 |
| 4,699,477 | 10/1987 | Clarke ..................................... 359/650 |
| 4,755,028 | 7/1988 | Moskovich . |
| 4,776,681 | 10/1988 | Moskovich . |
| 4,801,196 | 1/1989 | Betensky . |
| 4,900,139 | 2/1990 | Kreitzer . |
| 4,948,237 | 8/1990 | Hirata et al. . |
| 4,963,007 | 10/1990 | Moskovich . |
| 5,010,396 | 4/1991 | Hanyu et al. . |
| 5,055,922 | 10/1991 | Wessling . |

Primary Examiner—Scott J. Sugarman

[57] ABSTRACT

High performance projection lens systems for use in projection televisions are provided. The systems include A, B, C, and CR lens units. The A unit is composed of a negative subunit and a positive subunit, each of which have substantial optical power. The power of these subunits allows for better aberration control at greater field angles than that achieved with prior systems in which the elements of the unit were of weak power. In certain embodiments, the lens system is thermally compensated through the use of a positive plastic lens element as part of the B unit.

66 Claims, 7 Drawing Sheets

HIGH PERFORMANCE, THERMALLY-STABILIZED PROJECTION TELEVISION LENS SYSTEMS

BACKGROUND OF THE INVENTION

1. Field of the Invention

This invention relates to projection lens systems for use in projection televisions and, in particular, to high performance projection lens systems which can be thermally-stabilized so that the focus of the system does not substantially change between room temperature and the system's operating temperature.

2. Description of the Prior Art

Projection lens systems for CRT projection televisions have undergone continuing development during the past fifteen years or so. As a result, many of today's CRT projection televisions are equipped with fast lens systems which provide wide semi-fields of view.

When the field of view does not exceed a half-angle of about 25°, the lens system may consist of just three components and still provide a sufficiently high level of image quality. A typical configuration has a weak aspherical element on the image side of the lens system, followed by a strong positive power element, followed in turn by a strong negative element in close proximity to the CRT. See, for example, Betensky, U.S. Pat. Nos. 4,300,817, 4,348,081, and 4,526,442.

For this configuration, the aspherical first element provides correction primarily for aperture dependent aberrations including spherical aberration, the positive element provides most of the optical power of the system, the relative position of the aperture stop provides correction for astigmatism and lateral color, and the negative element close to the CRT provides correction for field dependent aberrations including the field curvature of the lens.

More generally, lens systems of this type can include more than three elements with the elements being arranged in three lens units, i.e., a "first" or "A" lens unit located on the image side of the lens system of weak power, a "second" or "B" lens unit following the first lens unit of strong positive power, and a "third" or "C" lens unit following the second lens unit of strong negative power.

When the focal length of the lens system is shortened to make the projection television more compact in the case of rear projection televisions or to make the magnification larger in the case of front projection televisions, the field coverage of the lens system must be increased. When the half-angle of view is increased to about 28°, a three element form generally cannot provide an appropriately high level of optical performance.

To address this problem, a fourth element or more generally a fourth unit (hereinafter referred to as the "corrector" or "CR" unit) has been added between the strong positive and the strong negative units of the three unit configuration, i.e., between the B and C units. See Betensky, U.S. Pat. No. 4,697892, and Moskovich, U.S. Pat. Nos. 4,682,862, 4,755, 028, and 4,776,681. This additional unit usually does not have much optical power; however, it must have an aspherical surface to correct for aperture dependent off-axis aberrations like sagittal oblique spherical and coma.

Color images for projection televisions are normally obtained by combining images from three color CRTs, i.e., a red CRT, a green CRT, and a blue CRT. The phosphors used in commercially available CRTs do not emit light at a single wavelength. In particular, green phosphors have significant sidebands in blue and red. Similar polychromaticity exists for red and blue phosphors, but to a lesser extent.

For many consumer applications, lens systems uncorrected for color can be used, notwithstanding the color spread of the CRTs. For more demanding applications, however, such as high definition television, data displays, or systems which operate at a high magnification, color correction is needed to avoid visible color fringing and/or a loss of image contrast.

A color-corrected projection lens is disclosed in Kreitzer, U.S. Pat. No. 4,900,139. This lens system employs the A, B, C, and CR units discussed above and achieves longitudinal color correction through the use of three lens elements in the B unit which are composed of suitable optical materials and have from the image end of the unit a negative/positive/positive arrangement. Although lens systems constructed in accordance with this patent have worked well in practice, these systems can be susceptible to focus shifts with changes in temperature. Also, the field angles of these systems have been somewhat less than that needed for certain wide angle applications.

Betensky, U.S. Pat. No. 4,801,196, discloses projection lenses having a first lens unit which includes multiple lens elements of weak optical power. As discussed more fully below, in accordance with the invention, it has been determined that the improvement in performance achievable through the use of multiple elements in the first lens unit is limited if those elements are of weak power.

The lens systems of the '196 patent also differ from those of the present invention in that they include a first lens unit which has an overall negative power. In contrast, the lens systems of the present invention have a first lens unit whose overall power is positive.

The lens elements of the '196 patent have highly aspheric surfaces such that their powers when calculated using their on-axis curvatures "may not be representative of the overall power contribution of the lens elements" ('196 patent, column 6, lines 10–11). To deal with this problem, the '196 patent provides curvatures obtained by fitting a spherical surface to the lens elements' aspherical surfaces ('196 patent, column 6, line 9, to column 7, line 51). In contrast, the lens systems of the present invention have lens elements whose on-axis curvatures are representative of the elements' powers.

Using on-axis curvatures, the lens systems of FIGS. 5 and 7 of the '196 patent have first lens elements which are negative followed by second lens elements which are positive, with the first-order, combined power of the first and second lens elements being positive for the FIG. 5 embodiment and negative for the FIG. 7 embodiment. ('196 patent, Tables VII and VIII for the FIG. 5 embodiment and Table V for the FIG. 7 embodiment). Using the sphere fitting approach, the first two lens elements of the FIG. 5 embodiment are again negative/positive but their combined power is now negative. ('196 patent, Tables VII-A and VIII-A). For the FIG. 7 embodiment, the sphere fitting approach gives a negative/negative sequence for the first two lens elements, with a combined power which is again negative. ('196 patent, Table V-A). In contrast, the lens systems of the present invention have a first lens subunit which is negative, a second lens subunit which is positive, and a combined power for the first and second lens subunits which is positive, whether powers are calculated using on-axis curvatures or the sphere fitting approach of the '196 patent (see Table 6).

Projection lens systems employing multiple lens elements in their first lens units are also disclosed in, for example, Moskovich, U.S. Pat. Nos. 4,682,862, 4,776,681 and 4,963,007. As with the '196 patent, these multiple elements have been of weak optical power.

SUMMARY OF THE INVENTION

In view of the foregoing state of the art, it is an object of the present invention to provide improved projection lens systems for use in projection televisions. More particularly, it is an object of the invention to provide projection lens systems which exhibit enhanced optical performance for wider fields of view than prior art projection lens systems. It is a further object of the invention to provide projection lens systems in which the focus of the system remains substantially constant as its temperature increases from room temperature to its operating temperature.

To achieve these and other objects, the invention in accordance with certain of its aspects provides a projection lens system for use with a cathode ray tube, said system having an overall positive optical power $\emptyset$ and comprising in order from the system's image side:

(a) a first lens unit which primarily corrects aperture dependent aberrations, said first lens unit having an overall positive optical power and comprising in order from the lens system's image side:
  (i) a first lens subunit having a negative optical power $\emptyset_1/$; and
  (ii) a second lens subunit having a positive optical power $\emptyset_2/$;
(b) a second lens unit which provides a substantial portion, e.g., the majority of the lens system's overall positive optical power; and
(c) a third lens unit of negative optical power which is associated with the cathode ray tube during use of the lens system and which provides most of the correction for the field curvature of the lens system.

The first lens unit preferably includes at least one lens element which has an aspheric surface. The overall power of the first lens unit is positive whether the first order or best sphere approach is used to determine the power of the element or elements having an aspheric surface.

In accordance with certain preferred embodiments of these aspects of the invention, the first lens unit has some or all of the following properties: the ratio of the absolute value of $\emptyset_1$ to $\emptyset$ is greater than about 0.1 and preferably greater than about 0.2; the ratio of $\emptyset_2$ to $\emptyset$ is greater than about 0.5 and preferably greater than about 0.75; the first lens subunit is composed of plastic, has an overall biconcave configuration, and includes at least one aspheric surface; and the second lens subunit is composed of glass, has an overall biconvex configuration, and includes only spherical surfaces.

In accordance with further preferred embodiments, the second lens unit comprises in order from the lens system's image side a negative first lens element, a positive second lens element, and a positive third lens element. This arrangement, together with the use of materials having appropriate dispersions, provides axial color correction for the lens system. In other preferred embodiments, specifically, those in which thermal compensation is provided (see below), the positive third lens element is a meniscus element and is composed of plastic.

In accordance with others of its aspects, the invention provides a projection lens system for use with a cathode ray tube, said system having an overall positive optical power and comprising a series of lens elements arranged to form, in order from the system's image side, at least the following lens units:

(a) a first lens unit which primarily corrects aperture dependent aberrations;
(b) a second lens unit which provides a substantial portion, e.g., the majority of the lens system's overall positive optical power, said second lens unit comprising at least one plastic element having a positive optical power; and
(c) a third lens unit of negative optical power which is associated with the cathode ray tube during use of the lens system and which provides most of the correction for the field curvature of the lens system;
wherein:
  (i) the distance between the third lens unit and the lens element nearest the third lens unit on the image side of said unit is D;
  (ii) D increases as the temperature of the lens system increases from room temperature to the lens system's operating temperature, said increase in D causing the focus of the lens system to change, said change normally being in a direction towards the lens system, i.e., the image produced by the lens system moves away from the screen and towards the lens system and the CRT; and
  (iii) the positive optical power of said at least one plastic element of the second lens unit decreases as the temperature of the lens system increases from room temperature to the lens system's operating temperature, said decrease in the positive optical power of the at least one plastic element of the second lens unit providing substantial compensation for the change in focus associated with the increase in D, specifically for the reduction in the distance between the image and the lens system.

The change in D results from a complex set of changes in the dimensions of the barrel or barrels holding the lens elements and of the coupler used to connect the lens system to the CRT. Examples of the barrels and couplers used in projection televisions can be found in Hsaya et al., U.S. Pat. No. 5,010,396, and Hirata et al., U.S. Pat. No. 4,948,237, the relevant portions of which are incorporated herein by reference.

In accordance with certain preferred embodiments of these aspects of the invention, the change in focus of the thermally-compensated lens system with temperature between room temperature and the system's operating temperature is less than about half the room temperature depth of focus at the image at the system's operating spatial frequency and magnification. For example, for a typical lens system constructed in accordance with the invention, the magnification is 10, the operating spatial frequency at the CRT is 5 cycles/millimeter, which for a magnification of 10, corresponds to 0.5 cycles/millimeter at the image (screen), and the room temperature depth of focus at the image is about 20 millimeters, i.e., about 10 millimeters forward and backward from the nominal focus. Accordingly, the positive plastic lens element or elements preferably control the focus of the lens system to within about 10 millimeters as the temperature increases from room temperature to the lens system's operating temperature.

The accompanying drawings, which are incorporated in and constitute part of the specification, illustrate the preferred embodiments of the invention, and together with the description, serve to explain the principles of the invention.

It is to be understood, of course, that both the drawings and the description are explanatory only and are not restrictive of the invention.

DESCRIPTION OF THE PREFERRED EMBODIMENTS

The lens systems of the invention preferably include A, B, CR, and C units wherein: 1) the A unit includes a first lens subunit having a relatively strong negative optical power and a second lens subunit having a relatively strong positive optical power; 2) the B unit provides axial color correction and includes a positive lens element; and 3) when a thermally compensated lens system is desired, the positive lens element of the B unit is composed of plastic.

Figure 1:
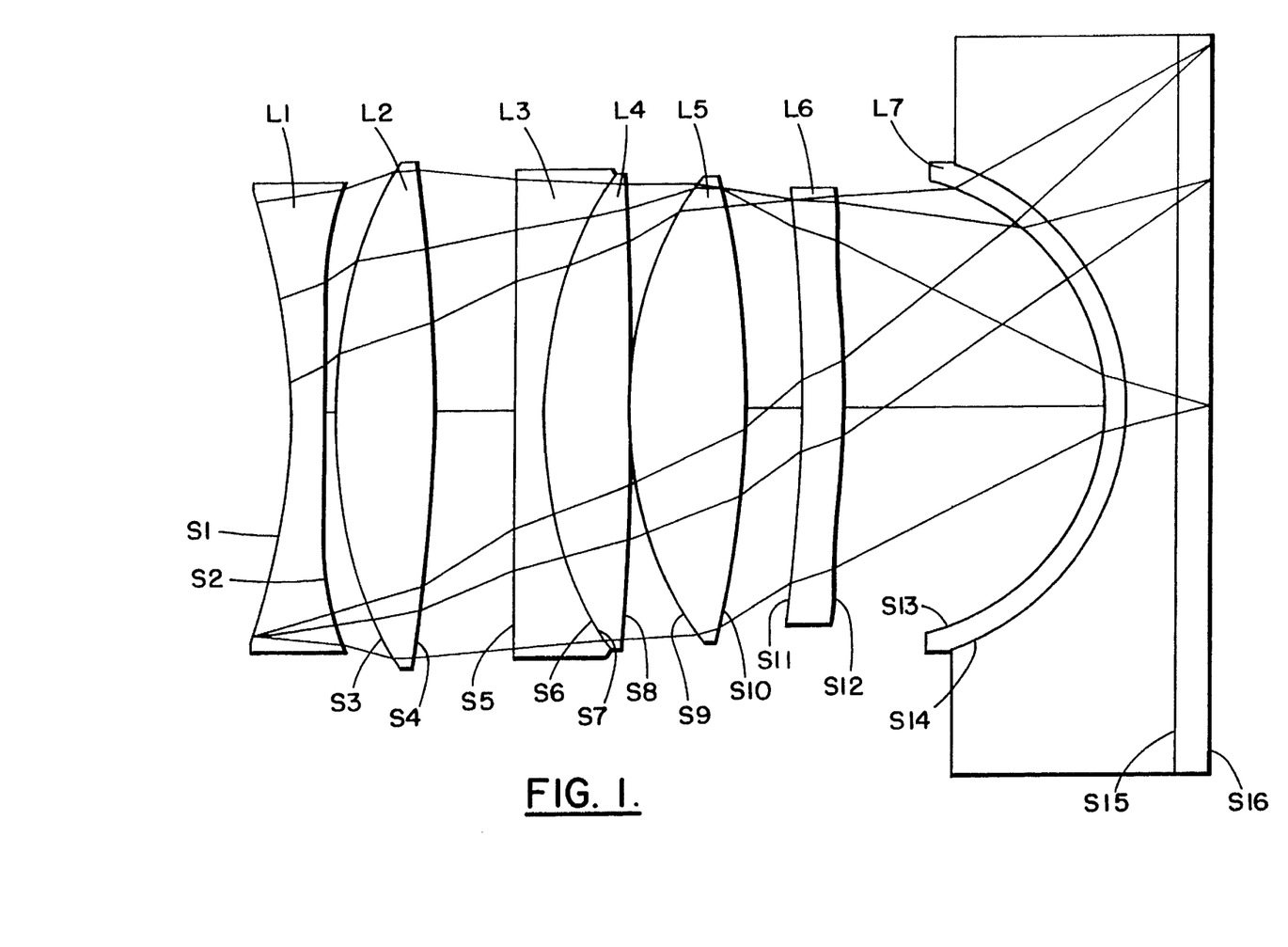
FIGS. 1 through 4 are schematic side views of lens systems constructed in accordance with the invention.
Figure 3:
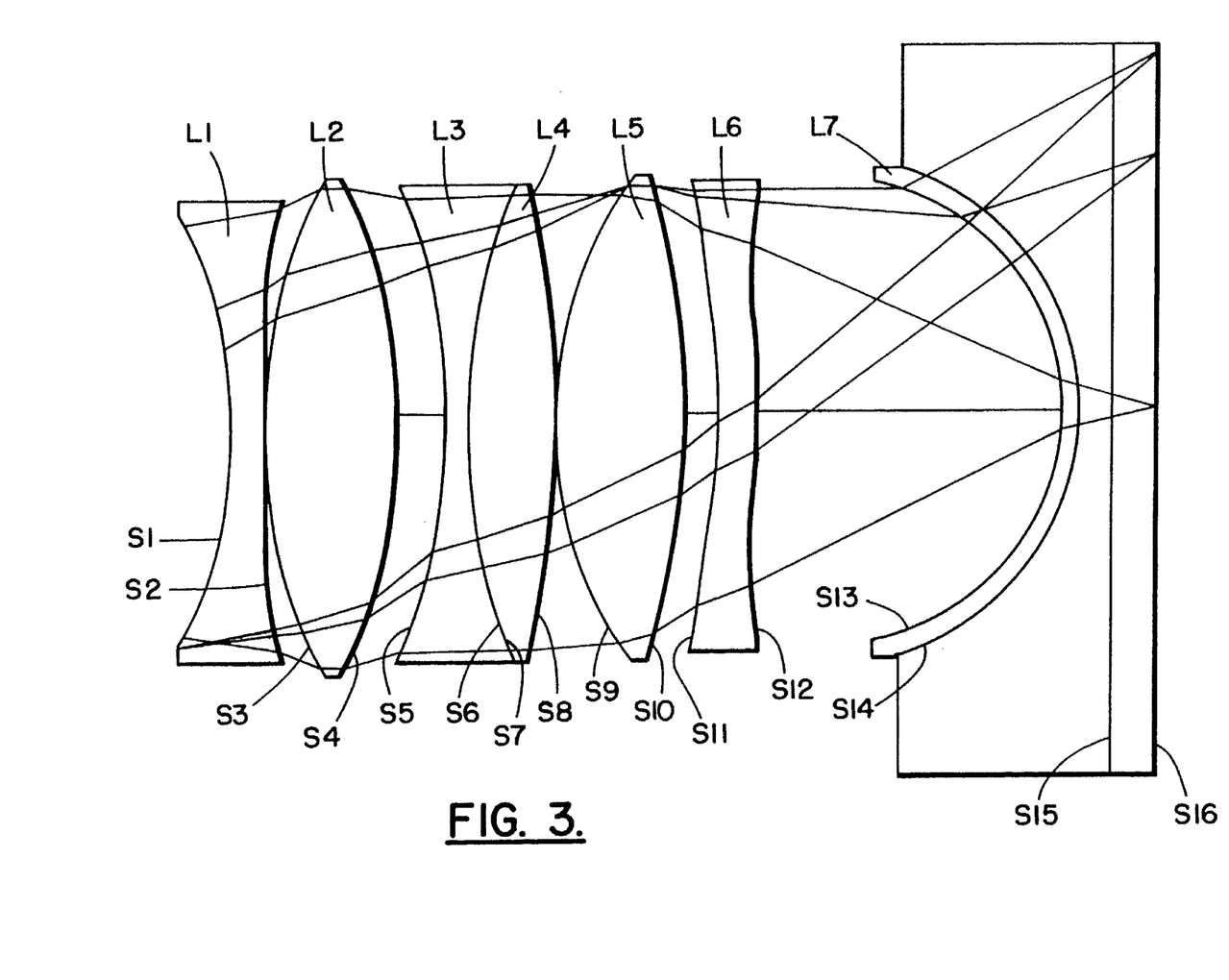
Figure 4:
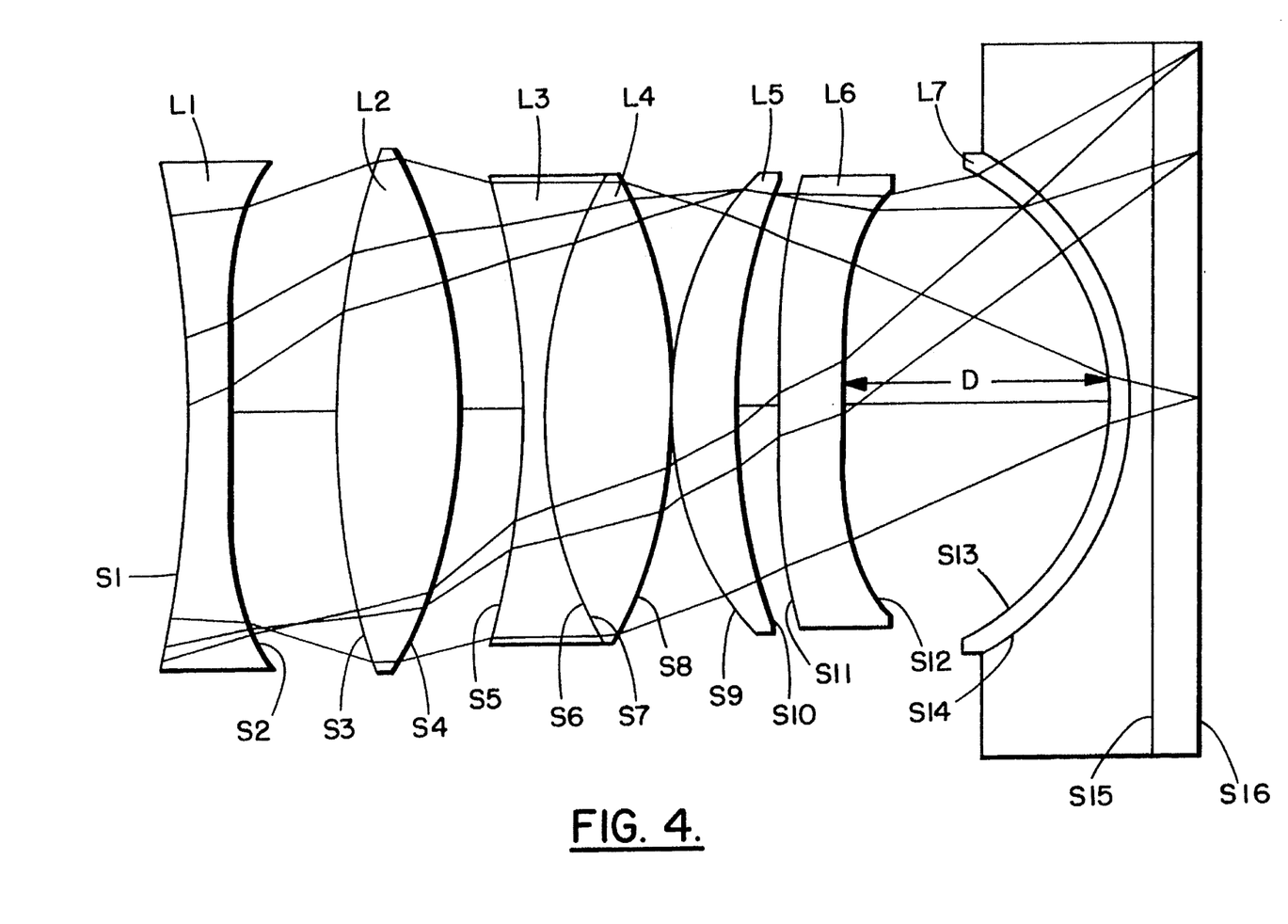

The A unit serves to correct aperture type aberrations including spherical aberration and coma. As discussed above, this unit includes two subunits, each of which can be composed of one or more lens elements. In FIGS. 1 and 3–4, the first subunit comprises a single lens element L1, while in FIG. 2, it comprises elements L1 and L2. In each of FIGS. 1–4, the second lens subunit comprises a single lens element, i.e., lens element L2 in FIGS. 1 and 3–4 and lens element L3 in FIG. 2.

Figure 2:
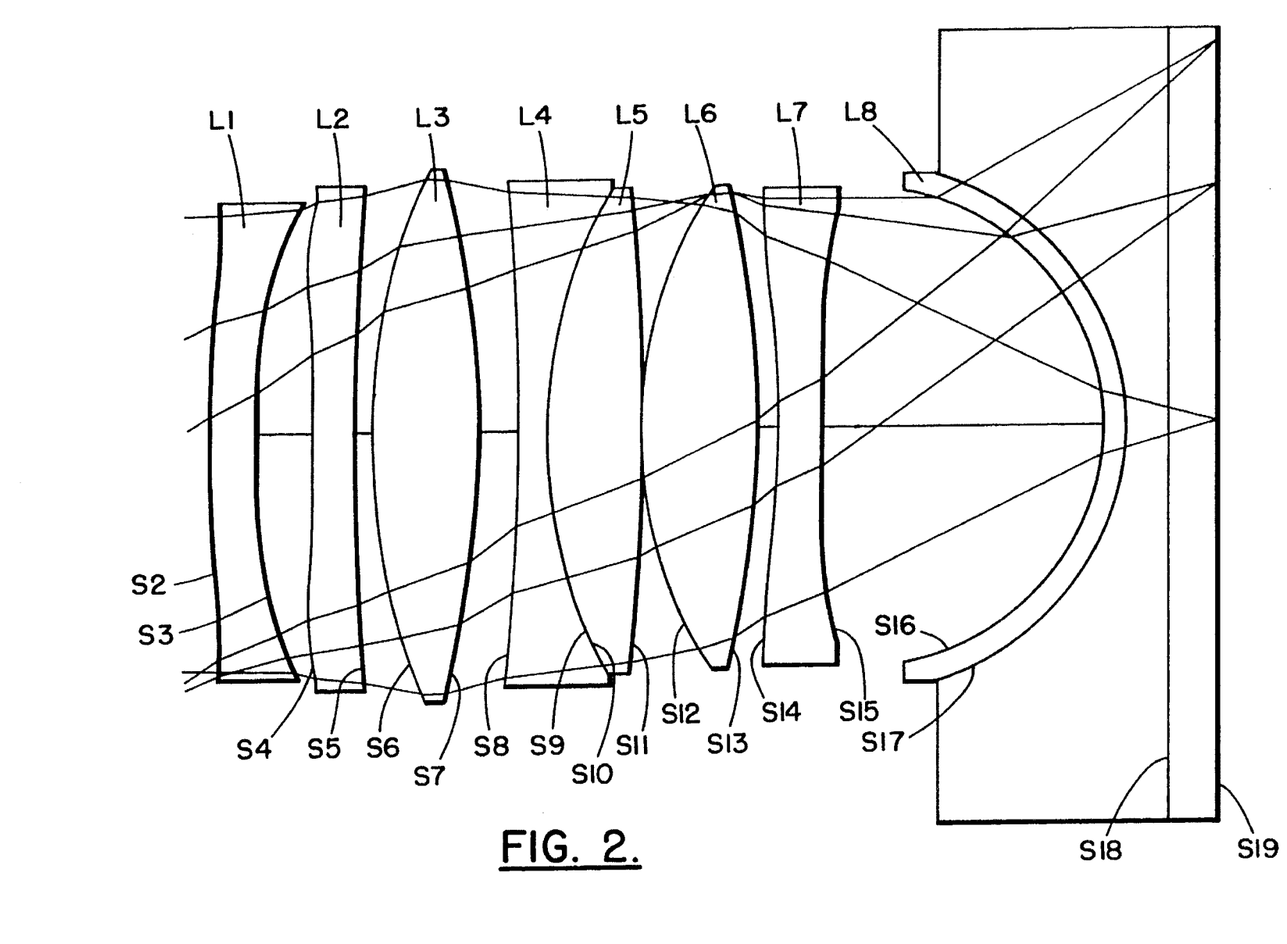

The first lens subunit preferably has an overall biconcave configuration (see FIGS. 1 and 3–4), although it can have other configurations (see FIG. 2). The subunit preferably includes at least one aspheric surface and the elements of the subunit are preferably composed of a plastic material.

The second lens subunit preferably has an overall biconvex configuration, although it too can have other configurations. This subunit preferably does not include aspheric surfaces and is composed of glass.

In accordance with the invention, it has been determined that improved overall aberration correction can be achieved by providing the first and second subunits with substantial optical power. In this way, such aberrations as axial color and Petzval curvature can be substantially affected by the lens elements of the first lens unit.

Quantitatively, it is preferred that the absolute value of the optical power of the first subunit be at least about 10 percent and most preferably at least about 20 percent of the overall power of the lens system. Similarly, the optical power of the second subunit is preferably at least about 50 percent and most preferably at least about 75 percent of the system's overall power. The absolute value of the first subunit's negative power will normally be less than the positive power of the second subunit.

The B unit of the lens systems of the invention provides the majority of the lens system's positive optical power. The unit includes at least one positive element, e.g., biconvex element L5 in FIGS. 1 and 3, meniscus element L5 in FIG. 4, and biconvex element L6 in FIG. 2. To provide axial color correction, the unit also includes additional negative and positive elements having appropriate optical dispersions and powers, e.g., elements L3 and L4 in FIGS. 1 and 3–4 and elements L4 and L5 in FIG. 2. If thermal compensation is not required, the elements of the B unit are preferably composed of glass. If thermal compensation is desired, the additional positive and negative elements which are used to provide color correction are preferably composed of glass and the at least one positive element is composed of plastic (see below).

The CR and C units of the lens systems of the invention serve to correct off-axis aperture dependent aberrations and field dependent aberrations, respectively. In particular, the CR unit is effective in dealing with oblique spherical aberrations, while the C unit is effective in reducing the system's field curvature.

The CR unit preferably comprises a single aspherical lens element composed of plastic (e.g., L6 in FIGS. 1 and 3–4; L7 in FIG. 2), while the C unit is composed of an aspherical plastic lens element (e.g., L7 in FIGS. 1 and 3–4; L8 in FIG. 2) and a fluid for coupling the lens system to the faceplate of the CRT. If desired, the aspherical plastic lens element of the C unit can include an absorptive color filter material in accordance with Wessling, U.S. Pat. No. 5,055,922.

In FIGS. 1–4, the faceplate of the CRT is flat and thus does not contribute to the power of the C unit. When the faceplate is curved, in accordance with conventional practice, its power is included in calculating the overall properties of the lens system and, in particular, the properties of the C unit.

When used with cathode ray tubes, projection lens systems undergo a temperature rise from room temperature (RT) to an operating temperature (OT) as a result of the heat given off by the CRT. This temperature increase results in changes in the dimensions and optical properties of the lens system. In general, the heating effect is more pronounced in rear projection applications where the CRTs and lens systems are completely enclosed in a housing than in front projection applications where the front end of the projection lens system is exposed and can be cooled by the surrounding air.

In accordance with the invention, it has been determined that the net effect of the increase in temperature on the dimensions of the optical system can be approximated by an increase in the focus space of the lens system, which for the lens system of FIG. 4 comprises the space D between the C unit and the CR unit. For other lens systems the focus space may be between the B unit and the CR unit or between the B unit and the C unit or may constitute combinations thereof. In general terms, a focus space is a space between the B unit (power unit) and the CRT which can be adjusted to set the system's focus.

The change in focus space results from the interaction of various factors making up the lens system's housing. The housing typically includes one or more barrels holding the lens elements and a coupler used to attach the lens system to the CRT. The dimensions of each of these housing components vary in a complex manner, but as indicated above, the overall or net effect can be approximated at least to first order by a change in the focus space, namely, an increase in that space.

An increase in the focus space corresponds to moving the power components of the lens system away from the object which causes the image to move towards the lens system, i.e., to move the focus towards the lens system.

To compensate for this change in focus with an increase in temperature, the thermally-compensated lens systems of the invention include one or more plastic elements in the B unit, e.g., element L5 in FIG. 4. Optical plastics such as acrylics have indices of refraction which decrease as temperature increases. Also, the radii of a plastic element increase with increasing temperature. Accordingly, the magnitude of a plastic lens element's power, whether negative or positive, decreases as temperature increases. This decrease in power moves the focus away from the lens system, i.e., it is in the direction needed to compensate for the change in focus produced by the increase in the focus space.

In order to effectively compensate for the change in focus resulting from the increase in the focus space, the one or more plastic lens elements must 1) be at a location where the element or elements will experience a meaningful temperature change, e.g., relatively close to the CRT, 2) have a positive power, and 3) be sufficiently strong so that a decrease in the index of refraction and an increase in the surface radii of the one or more lens elements will produce a large enough compensation for the change in focus caused by the increase in the focus space.

In accordance with the invention, it has been found that these criteria can be satisfied by incorporating at least one positive plastic element in the B unit and preferably at the object side of the B unit. The power of the positive plastic element or, if multiple elements are used, the sum of the powers of the positive plastic elements preferably is at least about 15 percent and most preferably at least about 20 percent of the overall power of the lens system. Through the use of such positive element or elements, it has been found that thermal control of the focus of the lens system can be achieved so that the focus change between room temperature and the system's operating temperature is less than about half of the system's room temperature depth of focus at the image at the spatial frequency and magnification at which the system is designed to be used.

The use of one or more positive plastic elements in the B unit to control the thermal behavior of the lens system is facilitated by the incorporation of a relatively strong positive subunit in the A unit which is preferably composed of glass, e.g., element L2 in FIG. 4. The presence of such a subunit allows the power of the positive plastic element or elements of the B unit to be adjusted so that their decrease in power with increase in temperature relatively closely matches the change in focus resulting from the increase in the focus space.

Plastic elements other than those of the B unit will also exhibit a decrease in the magnitudes of their powers with an increase in temperature. In particular, as discussed above, the lens elements of the C unit, the CR unit, and the negative subunit of the A unit are preferably made of plastic, elements L7, L6, and L1, respectively, in FIG. 4. The effects of changes in the powers of these elements with temperature turn out to be secondary to those of the positive plastic lens element or elements of the B unit.

In particular, with regard to the C unit, the plastic element of this unit generally has little power. Also, it is located close to the object plane, i.e., the phosphor surface of the CRT tube, and thus changes in its power have a reduced effect on the location of the image produced by the lens system. As to the CR unit, the ratio of the power of this unit to the overall power of the system, i.e., $|\emptyset_{CR}|/\emptyset$, is normally is less than about 0.15 for the thermally compensated lens systems of the invention, where $\emptyset_{CR}$ is the power of the corrector unit and, as above, $\emptyset$ is the overall power of the system. The negative subunit of the A unit of FIG. 4 does have significant power. However, this subunit is located the farthest from the CRT and thus experiences a smaller temperature increase than that experienced by the plastic lens element or elements of the B unit.

Although secondary to the effects of the positive plastic lens element or elements of the B unit, these other plastic elements can have effects on the focus of the lens system which are significant. Accordingly, their effects can be used to provide even more precise thermal compensation. In practice, it has been found that it is the plastic element or elements of the B unit that are most important. As a rule of thumb, the power of this element or, if multiple positive plastic elements are used in the B unit, the sum of the powers of these plastic elements should generally be greater than the sum of the magnitudes of the powers of all other plastic elements in the system.

The glass elements of the lens system, e.g., elements L2, L3, and L4 in FIG. 4, will generally exhibit a change in power which is very small and usually can be ignored in providing thermal compensation for the lens system.

FIGS. 1 to 4 illustrate various lens systems constructed in accordance with the invention and referred to herein as Examples 1 to 4, respectively. Corresponding prescriptions appear in Tables 1 to 4, respectively. All of the lens systems include an A unit having a relatively strong negative subunit and a relatively strong positive subunit. In addition, the lens system of FIG. 4 also incorporates the thermal compensation aspects of the invention.

The aspheric coefficients set forth in the tables are for use in the following equation:

$$z = \frac{cy^2}{1 + [1 - (1+k)c^2y^2]^{1/2}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant which is zero for the lens systems of FIGS. 1–4.

The abbreviations used in these tables and in Table 5 are as follows: SN—surface number; CLR. AP.— clear aperture; EFL—effective focal length; ZP—zoom position; MAG—magnification; L—lens element number; U—lens unit number; INFINITE f/NO—infinity f-number; and FINITE f/NO—working (as opposed to infinity) f-number. The zoom spacings set forth in Table 4 are used to adjust the focus of the lens system to meet the requirements of specific applications.

Surfaces and lens elements are identified by "S" and "L" numbers, respectively, in the figures and tables. All dimensions given in the tables are in millimeters. Thickness values represent the distance between the surface with which the thickness value is aligned and the next higher surface number. They thus correspond to either lens thicknesses or lens spacings depending upon the surface number with which the thickness is associated. Surface 1 in Table 2 corresponds to the location of a vignetting aperture not shown in this figure.

Summaries of the various properties of the lens systems of FIGS. 1–4 are set forth in Table 5. As shown in this table, each of the lens systems has a $|\emptyset_{SU1}|/\emptyset$ value which is greater than 0.2 and a $\emptyset_{SU2}/\emptyset$ value which is greater than 0.75 where as above $\emptyset$ is the overall power of the lens system and $\emptyset_{SU1}$ and $\emptyset_{SU2}$ are as defined in Table 5 and correspond respectively to $\emptyset_1$ and $\emptyset_2$ referred to above and in the claims. As also shown in this table, each of the lens systems has a $|\emptyset_{CR}|/\emptyset$ value which is less than 0.25, and, in particular, the lens system of FIG. 4 has a $|\emptyset_{CR}|/\emptyset$ value which is less than 0.15.

With regard to the thermally-compensated FIG. 4 embodiment, the power of L5 is 0.00231 mm$^{-1}$ i.e., it is greater than 20 percent of the overall power of the lens system. Also, the sum of the magnitudes of the powers of the other plastic elements in the system, i.e., L1 L6, and L7, is 0.00216 mm$^{-1}$, which is less than the power of L5.

Table 6 sets forth the powers of the first subunit and its constituent parts when calculated using on-axis curvatures (referred to in the table as the "First Order Power") and best-fit sphere curvatures (referred to in the table as the "Best-Fit Sphere Power"). The best-fit sphere curvatures were calculated following procedures of the type set forth in U.S. Pat. No. 4,801,196. As shown by this table, the first unit of each of the lens systems of FIGS. 1–4 has a positive power whether that power is calculated using a first order or best sphere approach.

Figure 5:
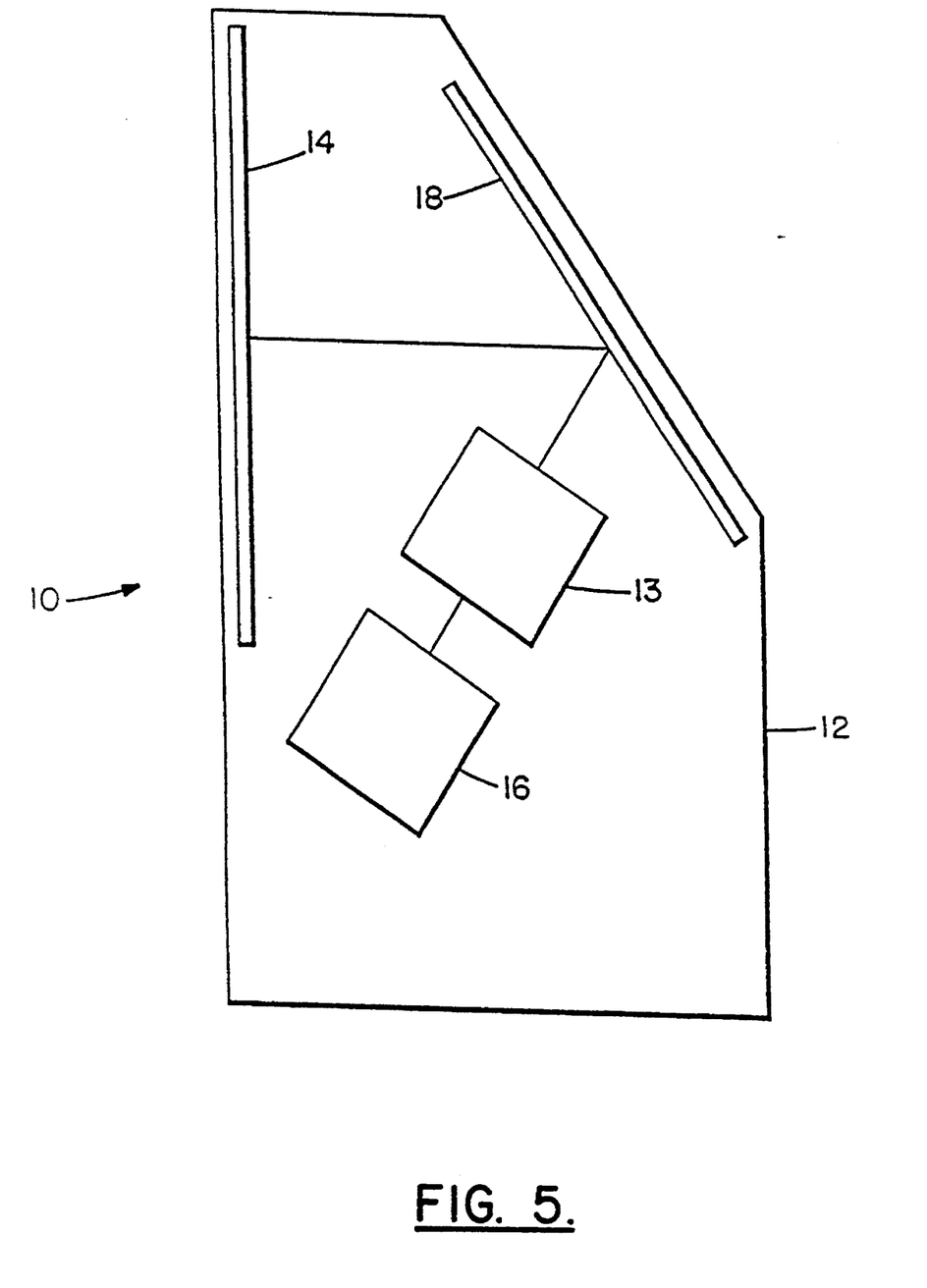
FIG. 5 is a schematic diagram of a rear projection TV employing a lens system constructed in accordance with the invention.

FIG. 5 is a schematic diagram of a rear projection television 10 constructed in accordance with the invention. As shown in this figure, projection television 10 includes cabinet 12 having projection screen 14 along its front face and slanted mirror 18 along its back face. Module 13 in FIG. 5 schematically illustrates a lens system constructed in accordance with the invention and module 16 illustrates its associated CRT tube. In practice, three lens systems 13 and three CRT tubes 16 are used to project red, green, and blue images onto screen 14. Front projection television sets do not include a mirror 18 or a screen 14 as part of cabinet 12, but otherwise operate in the same basic manner as a rear projection television set. In terms of the lens systems of FIGS. 1–4, those of FIGS. 1–3 are primarily suitable for front projection applications, while that of FIG. 4 is suitable for either front or rear projection applications.

Without intending to limit it in any manner, the present invention will be more fully described by the following examples.

COMPARATIVE EXAMPLE

This example compares the calculated optical performance of a lens system constructed in accordance with the invention, namely, the system of FIG. 4, and a prior art color-corrected lens system, namely, one constructed in accordance with Kreitzer, U.S. Pat. No. 4,900,139, (the "'139 patent"), and sold by U.S. Precision Lens Incorporated, (USPL), the assignee of this application, under the designation HD-6. In particular, the example compares the ability of these two lens systems to transfer information from a CRT to a screen with comparable resolution, namely, 10 cycles/mm at the CRT.

USPL's HD-6 lens system has a configuration similar to that of FIG. 3 of the '139 patent. That is, it includes a single element A unit, a B unit composed of three glass elements, a CR unit, and a C unit.

In a typical application, the lens system of FIG. 4 is used with a 7 inch CRT at a magnification of magnitude 10.56. Accordingly, a resolution at the CRT of 10 cycles/mm corresponds to a resolution at the screen of approximately 0.98 cycles/mm. The HD-6 lens, on the other hand, is used with a 5 inch CRT at a magnification of magnitude 22.1. 10 cycles/mm at the CRT for this lens system thus corresponds to approximately 0.5 cycles/mm at the screen. The half fields of view and infinite f-numbers for the FIG. 4 and HD-6 lens systems are 32.0°/1.19 and 23.1° /1.14, respectively.

Figure 6A:
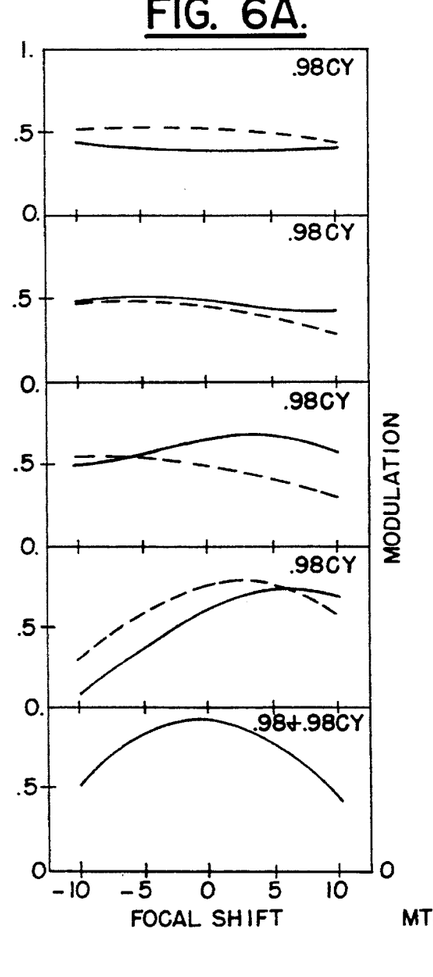
FIGS. 6 and 7 compare the optical performance of a lens system constructed in accordance with the invention (FIG. 6) with the optical performance of a lens system constructed in accordance with Kreitzer, U.S. Pat. No. 4,900,139 (FIG. 7).
Figure 6B:
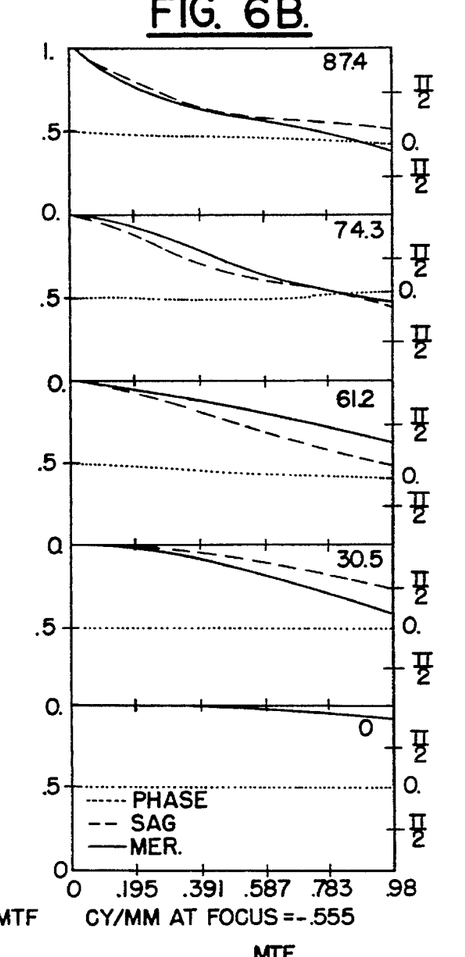
Figure 6C:
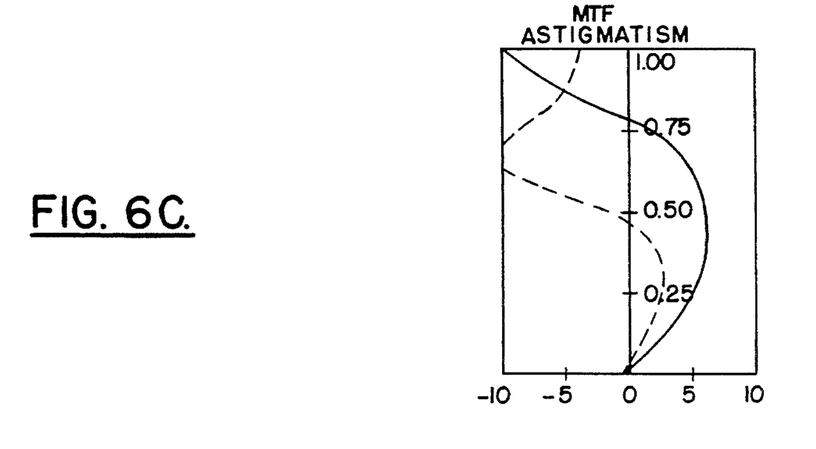
Figure 7A:
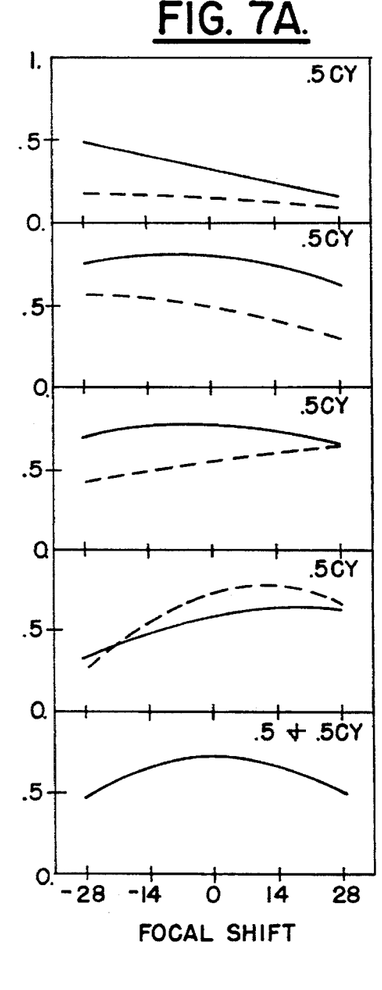
Figure 7B:
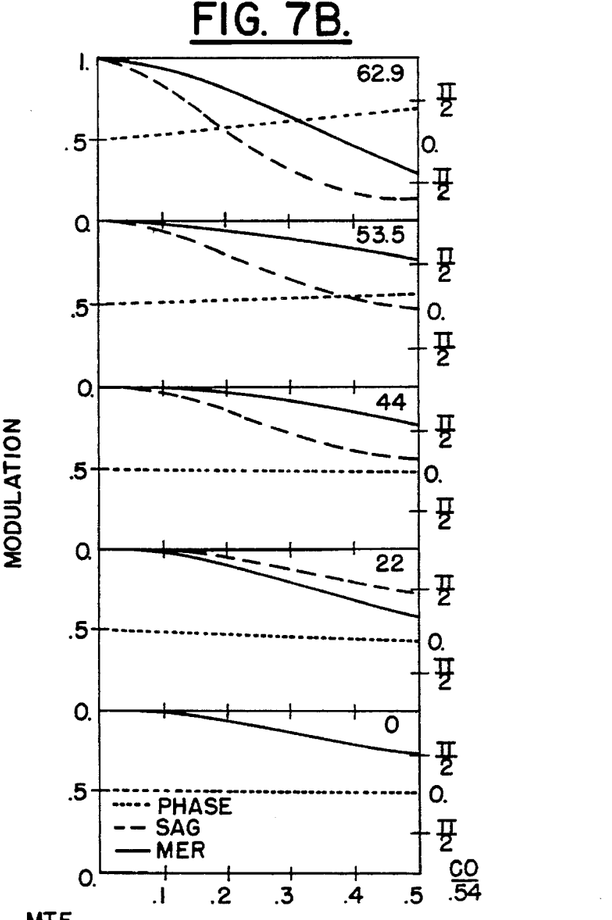
Figure 7C:
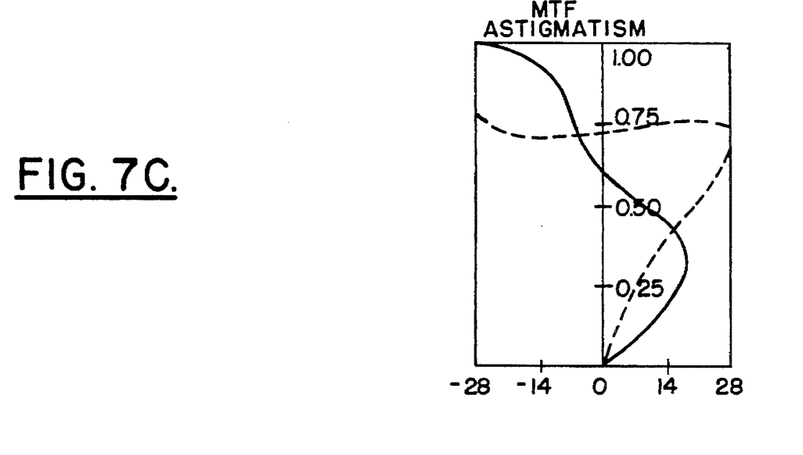

FIGS. 6 and 7 show optical transfer function (OTF) plots at the screen for the FIG. 4 and HD-6 lens systems, respectively. These plots show the through-focus modulation transfer function (MTF) on the left and the OTF at best axial focus on the right. The data are shown for five field points, viz., the axis, 0.35 H, 0.70 H 0.85 H and 1.0 H, where H is the maximum height on the CRT. The actual CRT field heights are shown for the right hand plots. These field heights apply to both the right hand and left hand plots and are in millimeters.

The through-focus data are at the indicated spatial frequency in cycles per millimeter. Both the through-focus and best-focus data indicate tangential and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure. All the OTF data are for a wavelength of 546.1 nanometers. The axial focus shift indicated beneath the best-focus plots is relative to the zero position of the through-focus plots. The best-focus plane is at the peak of the axial through-focus plot.

The MTF astigmatism plot shows the loci of the through-focus MTF peaks as a function of fractional field height. The data of these curves is determined from the through-focus MTF plots.

The data of FIGS. 6 and 7 show similar levels of optical performance corresponding to 10 cycles/millimeter at the CRT. Since the diameter of the CRT for the FIG. 4 lens is 7 inches, while that for the HD-6 system is only 5 inches, this means that the FIG. 4 lens system can project essentially twice as much information as the HD-6 system (area of 7 inch CRT divided by area of 5 inch CRT equals 1.96) at the same resolution. The lens system of FIG. 4 thus exhibits higher performance than that achieved by the HD-6 system.

EXAMPLE

This example illustrates the thermal compensation which can be achieved by the lens system of FIG. 4.

The power of element L5 of the FIG. 4 lens system, i.e., the thermal compensating element, was selected as follows. Experimentally, it was found that D increases by about 0.05 millimeters, i.e., about 50 microns, as a lens system of the type shown in FIG. 4 increases in temperature from room temperature to its operating temperature. In these experiments, the lens system was mounted in a two component plastic barrel and coupled to a 7 inch CRT by an aluminum coupler filled with a mixture of polyethylene glycol and water. The operating temperature in the vicinity of the B-unit was found to be approximately 55° C.

Using the lens configuration of FIG. 4, the combined effect on the focus of the system of changes in the powers of the L1, L6, and L7 elements with an increase in temperature from room temperature to operating temperature was calculated to be about 10 millimeters. Since half the depth of focus of the lens system at the image is of the same order of magnitude as this change in focus, if this had been the only change in focus with temperature, it could have been tolerated. However, a 0.05 millimeter change in D was calculated to correspond to a change in focus of approximately 7 millimeters in the same direction as the change in focus caused by the change in temperature of the L1, L6, and L7 elements. The combined change, i.e., approximately 17 millimeters, is substantially beyond the half depth of focus at the image of the lens system.

To compensate for this change in focus, element L5 was given an optical power of 0.00231 mm$^{-1}$. This power in combination with a temperature increase for the element from about 25° C. to about 55° C. was calculated to result in a change in the radii and particularly the index of the 5 element which produced exactly a 17 millimeter shift in the focus away from the lens system. Thus, element L5 can provide nominal exact cancellation for the focus shift caused by the changes in D and in L1, L6, and LT. The use of a positive plastic element as part of the B unit is thus able to compensate for the change in the dimensions of the lens system between room temperature and the system's operating temperature.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

LENS SYSTEM PRESCRIPTION

| SN | RADIUS | THICKNESS | $N_e$ | $V_e$ | CLR. AP. | LENS NO. |
|---|---|---|---|---|---|---|
| 1 | −121.7737 | 8.37000 | 1.49354 | 57.3 | 109.73 | L1 |
| 2 | −1029.3270 | 3.34000 | | | 113.16 | |
| 3 | 141.6387 | 23.37000 | 1.66152 | 50.6 | 122.56 | L2 |
| 4 | −382.5782 | 19.19539 | | | 122.54 | |
| 5 | −4688.8472 | 6.27000 | 1.76859 | 26.3 | 117.12 | L3 |
| 6 | 114.4127 | 0.06000 | | | 114.53 | |
| 7 | 114.7817 | 21.33000 | 1.61521 | 58.3 | 114.54 | L4 |
| 8 | −1160.6960 | 0.15000 | | | 114.45 | |
| 9 | 105.2380 | 27.80000 | 1.51872 | 64.0 | 112.82 | L5 |
| 10 | −233.0829 | 14.05866 | | | 110.57 | |
| 11 | −272.3030 | 10.00000 | 1.49354 | 57.3 | 103.58 | L6 |
| 12 | −245.4825 | 63.06959 | | | 105.17 | |
| 13 | −59.1165 | 5.00000 | 1.49354 | 57.3 | 108.66 | L7 |
| 14 | −66.0000 | 13.00000 | 1.44300 | 50.0 | 116.17 | |
| 15 | ∞ | 7.00000 | 1.53700 | 50.0 | 170.00 | |
| 16 | ∞ | −0.00461 | | | 178.00 | |

ASPHERICAL SURFACE DATA

| SN | AD | AE | AF | AG | AH | AI |
|---|---|---|---|---|---|---|
| 1 | 6.2371E-07 | −1.5969E-10 | 3.9741E-14 | −5.9196E-18 | 3.7647E-22 | 4.0733E-28 |
| 2 | 7.7608E-07 | −1.4270E-10 | 3.9892E-14 | −5.5063E-18 | 1.2298E-22 | 4.3088E-26 |
| 11 | 4.3194E-07 | −2.7826E-11 | 1.6666E-14 | −1.5625E-17 | 3.4447E-21 | −5.1785E-25 |
| 12 | 6.1134E-07 | 7.3788E-11 | −7.0154E-14 | 3.0483E-17 | −9.7051E-21 | 8.0774E-25 |
| 13 | −4.6426E-07 | 4.2269E-10 | −1.8385E-13 | 3.4991E-17 | 2.7468E-21 | −1.4407E-24 |

| EFL | MAG | FINITE f/NO | INFINITE f/NO | HFOV |
|---|---|---|---|---|
| 130.379 | −0.0288 | 1.25 | 1.20 | 33.7° |

TABLE 2

LENS SYSTEM PRESCRIPTION

| SN | RADIUS | THICKNESS | $N_e$ | $V_e$ | CLR. AP. | LENS NO. |
|---|---|---|---|---|---|---|
| 1 | ∞ | 6.00000 | | | 112.21 | |
| 2 | 364.1018 | 10.00000 | 1.49354 | 57.3 | 105.31 | L1 |
| 3 | 315.0393 | 13.30089 | | | 105.27 | |
| 4 | −564.5333 | 10.00000 | 1.49354 | 57.3 | 108.31 | L2 |
| 5 | 443.1041 | 3.80988 | | | 111.68 | |
| 6 | 158.8305 | 23.33000 | 1.66152 | 50.6 | 117.98 | L3 |
| 7 | −236.7689 | 8.47164 | | | 117.74 | |

TABLE 2-continued

| | | | | | | |
|---|---|---|---|---|---|---|
| 8 | −690.1444 | 6.79000 | 1.76859 | 26.3 | 111.54 | L4 |
| 9 | 118.3896 | 0.06000 | | | 107.61 | |
| 10 | 118.8521 | 20.86000 | 1.64129 | 55.2 | 107.61 | L5 |
| 11 | −570.6875 | 0.18000 | | | 106.99 | |
| 12 | 102.2173 | 26.11000 | 1.51872 | 64.0 | 107.42 | L6 |
| 13 | −229.9412 | 5.15133 | | | 106.81 | |
| 14 | −169.8054 | 10.19000 | 1.49354 | 57.3 | 105.44 | L7 |
| 15 | −401.1010 | 61.64380 | | | 104.92 | |
| 16 | −61.0496 | 5.00000 | 1.49354 | 57.3 | 105.13 | L8 |
| 17 | −62.0000 | 9.10000 | 1.44300 | 50.0 | 112.43 | |
| 18 | ∞ | 11.00000 | 1.51900 | 60.0 | 166.00 | |
| 19 | ∞ | 0.00264 | | | 178.00 | |

ASPHERICAL SURFACE DATA

| SN | AD | AE | AF | AG | AH | AI |
|---|---|---|---|---|---|---|
| 2 | 6.4750E−09 | −3.9982E−11 | −5.0783E−15 | −3.6731E−18 | −1.3571E−21 | 5.4012E-25 |
| 3 | 5.5274E−07 | 4.1754E−11 | 2.9134E−15 | 1.2366E−18 | −5.2096E−22 | −2.6371E-25 |
| 4 | −6.0803E−08 | 1.4771E−10 | −1.0279E−14 | 8.1167E−18 | 1.1650E−21 | −9.6519E-25 |
| 5 | −3.9656E−07 | 1.0623E−10 | −1.8164E−14 | 4.4396E−18 | −6.4033E−23 | −2.1545E-25 |
| 14 | 1.2780E−06 | −2.7344E−10 | 4.3782E−14 | −1.7826E−17 | 4.9563E−21 | −6.8289E-25 |
| 15 | 1.4919E−06 | −1.3229E−10 | −7.4159E−14 | 3.7147E−17 | −8.7666E−21 | 1.4181E-25 |
| 16 | −1.6754E−06 | 1.3128E−09 | −4.1149E−13 | −1.7809E−16 | 1.4156E−19 | −2.6114E-23 |

| EFL | MAG | FINITE f/NO | INFINITE f/NO | HFOV |
|---|---|---|---|---|
| 127.243 | −0.0263 | 1.26 | 1.22 | 33.8° |

TABLE 3

LENS SYSTEM PRESCRIPTION

| SN | RADIUS | THICKNESS | $N_e$ | $V_e$ | CLR. AP. | LENS NO. |
|---|---|---|---|---|---|---|
| 1 | −105.5751 | 8.37000 | 1.49354 | 57.3 | 106.35 | L1 |
| 2 | −672.3090 | 0.50000 | | | 110.76 | |
| 3 | 146.2882 | 31.28000 | 1.66152 | 50.6 | 120.29 | L2 |
| 4 | −146.2882 | 10.94176 | | | 120.76 | |
| 5 | −177.6879 | 6.27000 | 1.76168 | 27.3 | 113.50 | L3 |
| 6 | 159.6634 | 0.07700 | | | 114.29 | |
| 7 | 160.7283 | 20.82000 | 1.64129 | 55.2 | 114.29 | L4 |
| 8 | −275.5658 | 0.20000 | | | 114.68 | |
| 9 | 104.2756 | 31.11000 | 1.51872 | 64.0 | 117.01 | L5 |
| 10 | −203.4184 | 7.92700 | | | 116.88 | |
| 11 | −130.6706 | 9.41000 | 1.49354 | 57.3 | 113.49 | L6 |
| 12 | −171.7183 | 75.09294 | | | 112.59 | |
| 13 | −60.3931 | 5.00000 | 1.49354 | 57.3 | 110.62 | L7 |
| 14 | −64.0000 | 6.00000 | 1.43900 | 50.0 | 117.33 | |
| 15 | ∞ | 11.00000 | 1.53700 | 50.0 | 166.00 | |
| 16 | ∞ | −0.00323 | | | 178.00 | |

ASPHERICAL SURFACE DATA

| SN | AD | AE | AF | AG | AH | AI |
|---|---|---|---|---|---|---|
| 1 | 3.3652E−07 | −4.4531E−11 | 5.4941E−15 | 3.7264E−19 | −3.7508E−22 | 5.7601E-26 |
| 2 | 5.5034E−07 | −5.8945E−12 | −6.4833E−15 | 5.7314E−18 | −1.5632E−21 | 1.6260E-25 |
| 11 | 1.2099E−06 | −9.9835E−11 | −2.2009E−14 | 1.7607E−19 | 8.0463E−22 | −1.5432E-25 |
| 12 | 1.4080E−06 | −2.7101E−11 | −4.6786E−14 | 9.4502E−18 | −1.8109E−21 | −1.0423E-26 |
| 13 | −1.1307E−06 | 6.5998E−10 | −1.7435E−13 | −1.8313E−17 | 2.0247E−20 | −3.1834E-24 |

| EFL | MAG | FINITE f/NO | INFINITE f/NO | HFOV |
|---|---|---|---|---|
| 119.103 | −0.0980 | 1.30 | 1.15 | 32.4° |

TABLE 4

LENS SYSTEM PRESCRIPTION

| SN | RADIUS | THICKNESS | $N_e$ | $V_e$ | CLR. AP. | LENS NO. |
|---|---|---|---|---|---|---|
| 1 | −169.1728 | 10.00000 | 1.49354 | 57.3 | 122.85 | L1 |
| 2 | −501.3997 | 26.21444 | | | 110.54 | |
| 3 | 207.2121 | 30.30000 | 1.64129 | 55.2 | 126.41 | L2 |
| 4 | −138.6491 | 16.65592 | | | 127.04 | |
| 5 | −215.4754 | 6.20000 | 1.73432 | 28.1 | 114.97 | L3 |
| 6 | 129.5710 | 0.08200 | | | 114.02 | |
| 7 | 130.2845 | 31.00000 | 1.64129 | 55.2 | 114.02 | L4 |
| 8 | −130.2845 | 0.15000 | | | 114.13 | |
| 9 | 95.3243 | 16.00000 | 1.49354 | 57.3 | 111.63 | L5 |
| 10 | 162.6043 | 10.61249 | | | 109.83 | |
| 11 | −1703.2710 | 15.25198 | 1.49354 | 57.3 | 109.40 | L6 |
| 12 | 994.9310 | 66.29559 | | | 104.53 | |
| 13 | −72.6908 | 5.00000 | 1.53111 | 46.5 | 115.26 | L7 |
| 14 | −72.0000 | 6.00000 | 1.43900 | 50.0 | 120.41 | |
| 15 | ∞ | 11.00000 | 1.53700 | 50.0 | 163.52 | |
| 16 | ∞ | 0.00407 | | | 178.00 | |

ASPHERICAL SURFACE DATA

| SN | AD | AE | AF | AG | AH | AI |
|---|---|---|---|---|---|---|
| 1 | 4.7556E−07 | −4.7815E−12 | −1.5952E−14 | 4.8239E−19 | 3.3058E−22 | −2.8535E−26 |
| 2 | 8.2442E−07 | 6.8237E−11 | −2.3892E−14 | 4.6961E−19 | 1.0456E−21 | −1.5233E−25 |
| 9 | 3.9144E−08 | 2.6405E−12 | 5.2900E−15 | 1.2735E−18 | 9.4991E−23 | −7.6842E−26 |
| 11 | 9.6684E−07 | −9.6024E−11 | 6.7041E−15 | −1.2783E−17 | 3.0837E−21 | −7.9844E−26 |
| 12 | 1.2158E−06 | 7.1548E−11 | −7.9963E−14 | 3.3385E−17 | −9.4825E−21 | 1.5438E−24 |
| 13 | −1.1783E−06 | 9.2161E−10 | −3.1954E−13 | 2.0690E−17 | 1.0862E−20 | −1.8707E−24 |

ZOOM SPACINGS

| ZP\SN | 12 | EFL | MAG | FINITE f/NO | INFINITE f/NO | HFOV |
|---|---|---|---|---|---|---|
| 1 | 64.518 | 121.439 | −0.0900 | 1.32 | 1.19 | 32° |
| 2 | 65.355 | 120.815 | −0.0988 | 1.32 | 1.19 | 32° |
| 3 | 66.296 | 120.122 | −0.1090 | 1.34 | 1.19 | 32° |

TABLE 5

Unit and Subunit Powers*

| | $\varnothing_{SU1}/\varnothing$ | $\varnothing_{SU2}/\varnothing$ | $\varnothing_{U1}/\varnothing$ | $\varnothing_{U2}/\varnothing$ | $\varnothing_{CR}/\varnothing$ | $\varnothing_{U3}/\varnothing$ | $\varnothing$ (mm$^{-1}$) |
|---|---|---|---|---|---|---|---|
| Ex. 1 | −.464 | .820 | .395 | .803 | .029 | −.986 | .00767 |
| Ex. 2 | −.277 | .865 | .606 | .809 | −.210 | −.922 | .00786 |
| Ex. 3 | −.467 | 1.031 | .633 | .646 | −.099 | −.869 | .00840 |
| Ex. 4 | −.231 | .901 | .752 | .456 | −.095 | −.724 | .00828 |

*All powers are measured in air.

| | FIGS. 1, 3, 4 | FIG. 2 |
|---|---|---|
| SU1 | L1 | L1 + L2 |
| SU2 | L2 | L3 |
| U1 | L1 + L2 | L1 + L2 + L3 |
| U2 | L3 + L4 + L5 | L4 + L5 + L6 |
| OR | L6 | L7 |
| U3 | L7 + coupling fluid | L8 + coupling fluid |

TABLE 6*

| Unit/Subunit | First Order Power | Best Fit Sphere Power |
|---|---|---|
| Example 1 | | |
| $\varnothing_{SU1}/\varnothing$ | −.464 | −.561 |
| $\varnothing_{SU2}/\varnothing$ | .820 | .820 |
| $\varnothing_{U1}/\varnothing$ | .395 | .282 |
| Example 2 | | |

TABLE 6*-continued

| Unit/Subunit | First Order Power | Best Fit Sphere Power |
|---|---|---|
| $\varnothing_{SU1}/\varnothing$ | −.277 | −.365 |
| $\varnothing_{SU2}/\varnothing$ | .865 | .865 |
| $\varnothing_{U1}/\varnothing$ | .606 | .562 |
| Example 3 | | |

TABLE 6*-continued

| Unit/Subunit | First Order Power | Best Fit Sphere Power |
|---|---|---|
| $\emptyset_{SU1}/\emptyset$ | −.467 | −.598 |
| $\emptyset_{SU2}/\emptyset$ | 1.031 | 1.031 |
| $\emptyset_{U1}/\emptyset$ | .633 | .511 |
| Example 4 | | |
| $\emptyset_{SU1}/\emptyset$ | −.231 | −.425 |
| $\emptyset_{SU2}/\emptyset$ | .901 | .901 |
| $\emptyset_{U1}/\emptyset$ | .752 | .606 |

*$\emptyset$ values were calculated using base radii and are the same as in Table 5.

What is claimed is:

1. A projection lens system for use with a cathode ray tube, said system having an overall positive optical power $\emptyset$ and comprising in order from the system's image side:
   (a) a first lens unit which primarily corrects aperture dependent aberrations, said first lens unit having an overall positive optical power and comprising in order from the lens system's image side:
      (i) a first lens subunit having a negative optical power $\emptyset_1$; and
      (ii) a second lens subunit having a positive optical power $\emptyset_2$;
   (b) a second lens unit which provides a substantial portion of the lens system's overall positive optical power; and
   (c) a third lens unit of negative optical power which is associated with the cathode ray tube during use of the lens system and which provides most of the correction for the field curvature of the lens systems,
   wherein the first lens subunit has an overall biconcave configuration.

2. The projection lens system of claim 1 wherein the ratio of the absolute value of $\emptyset_1$ to $\emptyset$ is greater than about 0.1.

3. The projection lens system of claim 1 wherein the first lens subunit is composed of plastic.

4. The projection lens system of claim 1 wherein the first lens subunit has at least one aspheric surface and the power of the first lens unit is determined using a best sphere fit to the aspheric surface.

5. The projection lens system of claim 1 wherein the ratio of $\emptyset_2$ to $\emptyset$ is greater than about 0.5.

6. The projection lens system of claim 1 wherein the second lens subunit is composed of glass.

7. The projection lens system of claim 1 wherein the second lens subunit has an overall biconvex configuration.

8. The projection lens system of claim 1 wherein the second lens subunit has only spherical surfaces.

9. The projection lens system of claim 1 wherein the second lens unit comprises in order from the lens system's image side:
   (i) a negative first lens element;
   (ii) a positive second lens element; and
   (iii) a positive third lens element.

10. The projection lens system of claim 9 wherein the negative first lens element and the positive second lens element are each composed of glass.

11. The projection lens system of claim 9 wherein the positive third lens element is composed of plastic.

12. The projection lens system of claim 9 wherein the positive third lens element is a meniscus element.

13. The projection lens system of claim 9 wherein the positive third lens element is biconvex.

14. The projection lens system of claim 1 wherein the second lens unit is composed of glass.

15. The projection lens system of claim 1 wherein the second lens unit has only spherical surfaces.

16. The projection lens system of claim 1 further comprising a corrector lens unit having an optical power $\emptyset_{CR}$, said corrector lens unit being located between the second and third lens units and including at least one aspheric surface.

17. The projection lens system of claim 16 wherein the ratio of the absolute value of $\emptyset_{CR}$ to is $\emptyset$ is less than about 0.15.

18. A projection television set comprising a cathode ray tube, a screen, and a projection lens system for projecting light from the cathode ray tube onto the screen to form an image, said projection lens system comprising the projection lens system of claim 1.

19. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

20. The projection lens system of claim 1 wherein the second lens unit provides the majority of the lens system's overall positive optical power.

21. A projection lens system for use with a cathode ray tube, said system having an overall positive optical power $\emptyset$ and comprising in order from the system's image side:
   (a) a first lens unit which primarily corrects aperture dependent aberrations, said first lens unit having an overall positive optical power and comprising in order from the lens system's image side:
      (i) a first lens subunit having a negative optical power $\emptyset_1$, the ratio of the absolute value of $\emptyset_1$ to $\emptyset$ being greater than about 0.1; and
      (ii) a second lens subunit having a positive optical power $\emptyset_2$, the ratio of $\emptyset_2$ to $\emptyset$ being greater than about 0.5;
   (b) a second lens unit which provides a substantial portion of the lens system's overall positive optical power, said second lens unit comprising in order from the lens system's image side:
      (i) a negative first lens element;
      (ii) a positive second lens element; and
      (iii) a positive third lens element;
   (c) a corrector lens unit having at least one aspheric surface; and
   (d) a third lens unit of negative optical power which is associated with the cathode ray tube during use of the lens system and which provides most of the correction for the field curvature of the lens system.

22. The projection lens system of claim 21 wherein:
   the first lens subunit is composed of plastic, has at least one aspheric surface, and has an overall biconcave configuration and
   the second lens subunit is composed of glass, has only spherical surfaces, and has an overall biconvex configuration.

23. The projection lens system of claim 21 wherein the second lens unit is composed of glass and has only spherical surfaces.

24. The projection lens system of claim 21 wherein the positive third lens element is composed of plastic.

25. The projection lens system of claim 21 wherein the positive third lens element is a meniscus element.

26. The projection lens system of claim 21 wherein the positive third lens element is biconvex.

27. A projection television set comprising a cathode ray tube, a screen, and a projection lens system for projecting light from the cathode ray tube onto the screen to form an image, said projection lens system comprising the projection lens system of claim 21.

28. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 21.

29. The projection lens system of claim 21 wherein the second lens unit provides the majority of the lens system's overall positive optical power.

30. A projection lens system for use with a cathode ray tube, said system having an overall positive optical power Ø and comprising in .order from the system's image side:
  (a) a first lens unit which primarily corrects aperture dependent aberrations, said first lens unit having an overall positive optical power and comprising in order from the lens system's image side:
    (i) a first lens subunit composed of plastic and having a negative optical power $Ø_1$; and
    (ii) a second lens subunit composed of glass and having a positive optical power
  (b) a second lens unit which provides a substantial portion [the majority]of the lens system's overall positive optical power;
  (c) a corrector lens unit having at least one aspheric surface; and
  (d) a third lens unit of negative optical power which is associated with the cathode ray tube during use of the lens system and which provides most of the correction for the field curvature of the lens system.

31. The projection lens system of claim 30, wherein the ratio of the absolute value of $Ø_1$ to Ø is greater than about 0.1 and the ratio of $Ø_2$ to Ø is greater than about 0.5.

32. The projection lens system of claim 30 wherein the first lens subunit has an overall biconcave configuration and the second lens subunit has an overall biconvex configuration.

33. The projection lens system of claim 30 wherein the first lens subunit has at least one aspheric surface and the second lens subunit has only spherical surfaces.

34. The projection lens system of claim 33 wherein the ratio of the absolute value of $Ø_1$ to Ø is greater than about 0.1, the ratio of $Ø_2$ to Ø is greater than about 0.5, and $Ø_1$ is determined using a best fit sphere.

35. The projection lens system of claim 30 wherein the second lens unit is composed of glass and has only spherical surfaces.

36. The projection lens system of claim 30 wherein the second lens unit comprises in order from the lens system's image side:
  (i) a negative first lens element;
  (ii) a positive second lens element; and
  (iii) a positive third lens element.

37. The projection lens system of claim 36 wherein the positive third lens element is composed of plastic.

38. The projection lens system of claim 36 wherein the positive third lens element is a meniscus element.

39. The projection lens system of claim 36 wherein the positive third lens element is biconvex.

40. A projection television set comprising a cathode ray tube, a screen, and a projection lens system for projecting light from the cathode ray tube onto the screen to form an image, said projection lens system comprising the projection lens system of claim 30.

41. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 30.

42. The projection lens system of claim 30 wherein the second tens unit provides the majority of the lens system's overall positive optical power.

43. A projection lens system for use with a cathode ray tube, said system having an overall positive optical power Ø and comprising a series of lens elements arranged to form, in order from the system's image side, at least the following lens units:
  (a) a first lens unit which primarily corrects aperture dependent aberrations;
  (b) a second lens unit which provides a substantial portion of the lens system's overall positive optical power, said second lens unit comprising at least one plastic element having a positive optical power; and
  (c) a third lens unit of negative optical power which is associated with the cathode ray tube during use of the lens system and which provides most of the correction for the field curvature of the lens system;
  wherein:
  (i) the distance between the third lens unit and the lens element nearest the third lens unit on the image side of said unit is D;
  (ii) D increases as the temperature of the lens system increases from room temperature to the lens system's operating temperature, said increase in D causing the focus of the lens system to change; and
  (iii) the positive optical power of said at least one plastic element of the second lens unit decreases as the temperature of the lens system increases from room temperature to the lens system's operating temperature, said decrease in the positive optical power of the at least one plastic element of the second lens unit providing substantial compensation for the change in focus associated with the increase in D.

44. The projection lens system of claim 43 wherein the system has (a) an operating spatial frequency, (b) an operating magnification, and (c) a room temperature depth of focus at the image at said operating spatial frequency and said operating magnification, and wherein the change in focus of the system between room temperature and the system's operating temperature is less than about half of said room temperature depth of focus.

45. The projection lens system of claim 43 wherein said first lens unit has an overall positive optical power and comprises in order from the lens system's image side:
  (i) a first lens subunit having a negative optical power; and
  (ii) a second lens subunit having a positive optical power $Ø_2$.

46. The projection lens system of claim 45 wherein the ratio of $Ø_2$ to Ø is greater than about 0.5.

47. The projection lens system of claim 45 wherein the second lens subunit is composed of glass.

48. The projection lens system of claim 43 wherein the at least one plastic element is located at the object end of the second lens unit.

49. The projection lens system of claim 43 wherein the sum of the powers of the element or elements comprising the at least one plastic lens element is at least about 0.15 times Ø.

50. The projection lens system of claim 43 wherein the sum of the powers of the element or elements comprising the at least one plastic lens element is greater than the sum of the magnitudes of the powers of all other plastic lens elements in the lens system.

51. The projection lens system of claim 43 wherein the at least one plastic element comprises a meniscus element.

52. The projection lens system of claim 51 wherein the meniscus element is convex towards the image.

53. The projection lens system of claim 43 wherein the lens system includes a corrector unit and the distance D is between the third lens unit and the corrector unit.

54. A projection television set comprising a cathode ray tube, a screen, and a projection lens system for projecting light from the cathode ray tube onto the screen to form an image, said projection lens system comprising the projection lens system of claim 43.

55. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 43.

56. The projection lens system of claim 43 wherein the second lens unit provides the majority of the lens system's overall positive optical power.

57. In a projection television lens system which forms an image of an object and which includes (a) a housing, (b) a lens unit positioned in said housing at one end thereof which corrects for field curvature, and (c) other lens units including a power unit which provides substantial portion of the lens system's positive optical power, the improvement which comprises a positive plastic lens element included among said other lens units which has a power and is positioned in said housing such that the change in its power with temperature substantially compensates for the change in the focus of the system which results from changes in the location of the power unit relative to the object with changes in temperature.

58. The projection television lens system of claim 57 wherein the positive plastic lens element is in the power unit.

59. A projection television set comprising a cathode ray tube, a screen, and a projection lens system for projecting light from the cathode ray tube onto the screen to form an image, said projection lens system comprising the projection lens system of claim 57.

60. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 57.

61. The projection television lens system of claim 57 wherein the power unit provides the majority of the lens system's positive optical power.

62. A projection lens system for use with a cathode ray tube, said system having an overall positive optical power $\emptyset$ and comprising in order from the system's image side:

(a) a first lens element composed of plastic;

(b) a second lens element composed of glass;

(c) a third lens element composed of glass;

(d) a fourth lens element composed of glass;

(e) a fifth lens element composed of plastic;

(f) a corrector lens unit; and (g) a negative lens unit which is associated with the cathode ray tube during use of the lens system and which provides most of the correction for the field curvature of the lens system.

63. The projection lens system of claim 62 wherein the first lens element has a negative power, the second lens element has a positive power, the third lens element has a negative power, the fourth lens elements has a positive power, and the fifth lens element has a positive power.

64. The projection lens system of claim 63 wherein the ratio of the absolute value of the power of the first lens element to $\emptyset$ is greater than about 0.1, the ratio of the power of the second lens element to is greater than about 0.5, and the ratio of the power of the fifth lens element to $\emptyset$ is greater than about 0.15.

65. A projection television set comprising a cathode ray tube, a screen, and a projection lens system for projecting light from the cathode ray tube onto the screen to form an image, said projection lens system comprising the projection lens system of claim 62.

66. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 62.

* * * * *

UNITED STATES PATENT AND TRADEMARK OFFICE
CERTIFICATE OF CORRECTION

PATENT NO. : 5,455,713
DATED : October 3, 1995
INVENTOR(S) : Melvyn H. Kreitzer

It is certified that error appears in the above-identified patent and that said Letters Patent is hereby corrected as shown below:

| Col. | Line | Description |
|------|------|-------------|
| 19 | 25 | Insert --$\emptyset_2$;--after "power" |
| 19 | 27 | Delete --[the majority]-- |
| 22 | 32 | Insert --$\emptyset$--after "to" |

Signed and Sealed this

Second Day of May, 2000

Q. TODD DICKINSON

*Attest:*

*Attesting Officer*      *Director of Patents and Trademarks*